(12) United States Patent
Ameen et al.

(10) Patent No.: US 6,664,685 B2
(45) Date of Patent: Dec. 16, 2003

(54) HIGH ADHESION, WEAR RESISTANT COATINGS FOR SPINDLE MOTORS IN DISK DRIVE/STORAGE APPLICATIONS

(75) Inventors: Mohammad M. Ameen, Campbell, CA (US); Raquib U. Khan, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/020,089

(22) Filed: Dec. 13, 2001

(65) Prior Publication Data

US 2003/0094869 A1 May 22, 2003

Related U.S. Application Data

(60) Provisional application No. 60/332,490, filed on Nov. 16, 2001.

(51) Int. Cl.[7] .................................................. H02K 5/16
(52) U.S. Cl. ........................ 310/90; 310/67 R; 310/45
(58) Field of Search ................... 310/90, 67 R, 310/45; 360/99.08, 99.04; 384/107, 112

(56) References Cited

U.S. PATENT DOCUMENTS

| 5,142,173 A | 8/1992 | Konno et al. | |
|---|---|---|---|
| 5,366,298 A | * 11/1994 | Toshimitsu et al. | 384/107 |
| 5,678,929 A | * 10/1997 | Parsoneault et al. | 384/112 |
| 5,873,657 A | 2/1999 | Lee | 384/110 |
| 5,887,985 A | 3/1999 | Loree, II et al. | 384/492 |
| 5,921,731 A | 7/1999 | Chandrasekar | 409/231 |
| 5,947,610 A | 9/1999 | Feldbauer et al. | 384/112 |
| 5,957,587 A | 9/1999 | Hong | 384/108 |
| 5,965,217 A | 10/1999 | Sugiyama et al. | 427/577 |
| 5,969,448 A | * 10/1999 | Liu et al. | 310/90 |
| 5,998,898 A | 12/1999 | Fukutani et al. | 310/90 |
| 6,010,246 A | 1/2000 | Gomyo et al. | 384/115 |
| 6,144,523 A | 11/2000 | Murthy et al. | 360/99.08 |
| 6,155,721 A | 12/2000 | Kurosawa et al. | 384/100 |
| 6,242,831 B1 | 6/2001 | Khan | 310/90 |
| 6,280,088 B1 | 8/2001 | Leuthold et al. | 384/110 |
| 6,285,527 B1 | 9/2001 | Kennedy et al. | |
| 6,296,391 B1 | 10/2001 | Hayakawa et al. | 384/119 |
| 6,300,695 B1 | 10/2001 | Neal | 310/68 D |

FOREIGN PATENT DOCUMENTS

| EP | 0 600 468 A1 | 12/1993 |
|---|---|---|
| EP | 2000064053 | 8/1998 |
| EP | 2000213533 | 1/1999 |
| WO | PCT/US02/36579 | 11/2002 |

* cited by examiner

Primary Examiner—Thanh Lam
(74) Attorney, Agent, or Firm—Moser, Patterson & Sheridan, LLP

(57) ABSTRACT

A disc drive storage system including a housing having a central axis, a stationary member that is fixed with respect to the housing and coaxial with the central axis, and a rotatable member that is rotatable about the central axis with respect to the stationary member is described. A hydrodynamic bearing interconnects the stationary member and the rotatable member and includes at least one working surface comprising a wear resistant coating.

18 Claims, 5 Drawing Sheets

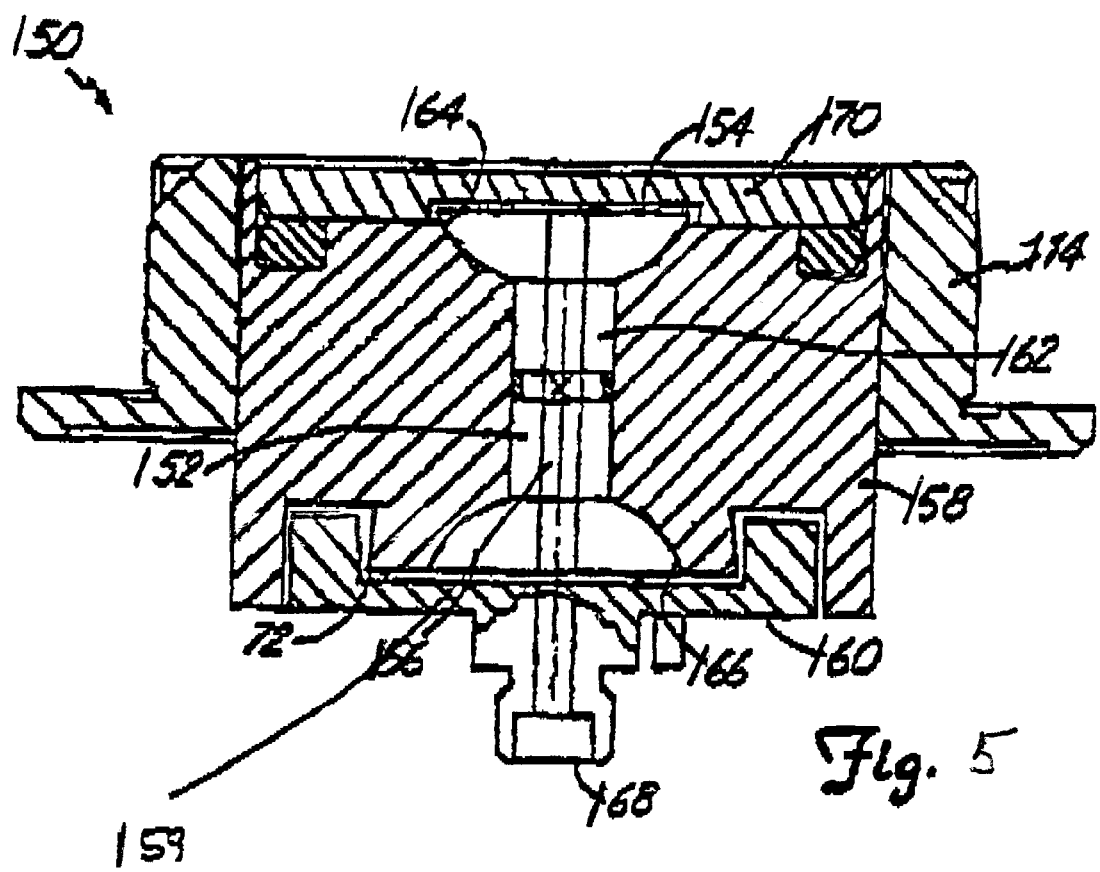

HIGH ADHESION, WEAR RESISTANT COATINGS FOR SPINDLE MOTORS IN DISK DRIVE/STORAGE APPLICATIONS

CROSS-REFERENCE TO RELATED APPLICATIONS

This application claims benefit of U.S. provisional application serial No. 60/332,490, filed Nov. 16, 2001, which is herein incorporated by reference.

BACKGROUND OF THE INVENTION

1. Field of the Invention

The present invention relates to the field of hydrodynamic motors for disc drive data storage devices and, more particularly, to a spindle motor with one or more bearing surfaces having a wear resistant coating thereon.

2. Description of the Related Art

Disc drive data storage devices, known as "Winchester" type disc drives, are well-known in the industry. In a Winchester disc drive, digital data is written to and read from a thin layer of magnetizable material on the surface of rotating discs. Write and read operations are performed through a transducer that is carried in a slider body. The slider and transducer are sometimes collectively referred to as a head, and typically a single head is associated with each disc surface. The heads are selectively moved under the control of electronic circuitry to any one of a plurality of circular, concentric data tracks on the disc surface by an actuator device. Each slider body includes a self-acting air bearing surface. As the disc rotates, the disc drags air beneath the air bearing surface, which develops a lifting force that causes the slider to lift and fly several microinches above the disc surface.

In the current generation of disc drive products, the most commonly used type of actuator is a rotary moving coil actuator. The discs themselves are typically mounted in a "stack" on the hub structure of a brushless DC spindle motor. The rotational speed of the spindle motor is precisely controlled by motor drive circuitry, which controls both the timing and the power of commutation signals directed to the stator windings of the motor. Typical spindle motor speeds have been in the range of 3600 RPM. Although, current technology has increased spindle motor speeds to 7200 RPM, 10,000 RPM, 15,000 RPM and above.

One of the principal sources of noise in disc drive data storage devices is the spindle motor. Disc drive manufacturers have recently begun looking at replacing conventional ball or roller bearings in spindle motors with "hydro" bearings, such as hydrodynamic or hydrostatic bearings. A hydrodynamic bearing relies on a fluid film which separates the bearing surfaces and is therefore much quieter and in general has lower vibrations than conventional ball bearings. A hydrodynamic bearing is a self-pumping bearing that generates a pressure internally to maintain the fluid film separation. A hydrostatic bearing requires an external pressurized fluid source to maintain the fluid separation. Relative motion between the bearing surfaces in a hydrodynamic bearing causes a shear element that occurs entirely within the fluid film such that no contact between the bearing surfaces occurs.

In a hydrodynamic bearing, a lubricating fluid or gas provides a bearing surface between, for example, a stationary member of the housing and a rotating member of the disc hub. Typical lubricants include oil or ferromagnetic fluids. Hydrodynamic bearings spread the bearing surface over a larger surface area in comparison with a ball bearing assembly, which comprises a series of point interfaces. This is desirable because the increased bearing surface decreases wobble or run-out between the rotating and fixed members.

Despite the presence of the lubricating fluid, in conventional hydrodynamic bearing spindle motors, the bearing surfaces are still subject to continuous wear. As a result, the gap between bearing surfaces gradually changes over the lifetime of the device, and often in a manner that is not uniform across the bearing surfaces. This results in reduced performance and eventual failure of the disk drive. Additionally, for a gas lubricated hydrodynamic bearing, low frictional properties for the bearing surfaces is also required.

Therefore, there exists a need in the art for a hydrodynamic fluid bearing surfaces having improved wear resistance as well as low frictional properties.

SUMMARY OF THE INVENTION

The disc drive data storage system of the present invention includes a housing having a central axis, a stationary member that is fixed with respect to the housing and coaxial with the central axis, and a rotatable member that is rotatable about the central axis with respect to the stationary member. A stator is fixed with respect to the housing. A rotor is supported by the rotatable member and is magnetically coupled to the stator. At least one data storage disc is attached to and is coaxial with the rotatable member. A hydrodynamic bearing couples the stationary member to the rotatable member. The hydrodynamic bearing includes at least one working surface with a wear resistant coating thereon.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 is a sectional view of a hydrodynamic bearing with conical bearing surfaces.

DETAILED DESCRIPTION OF THE PREFERRED EMBODIMENT

Figure 1:
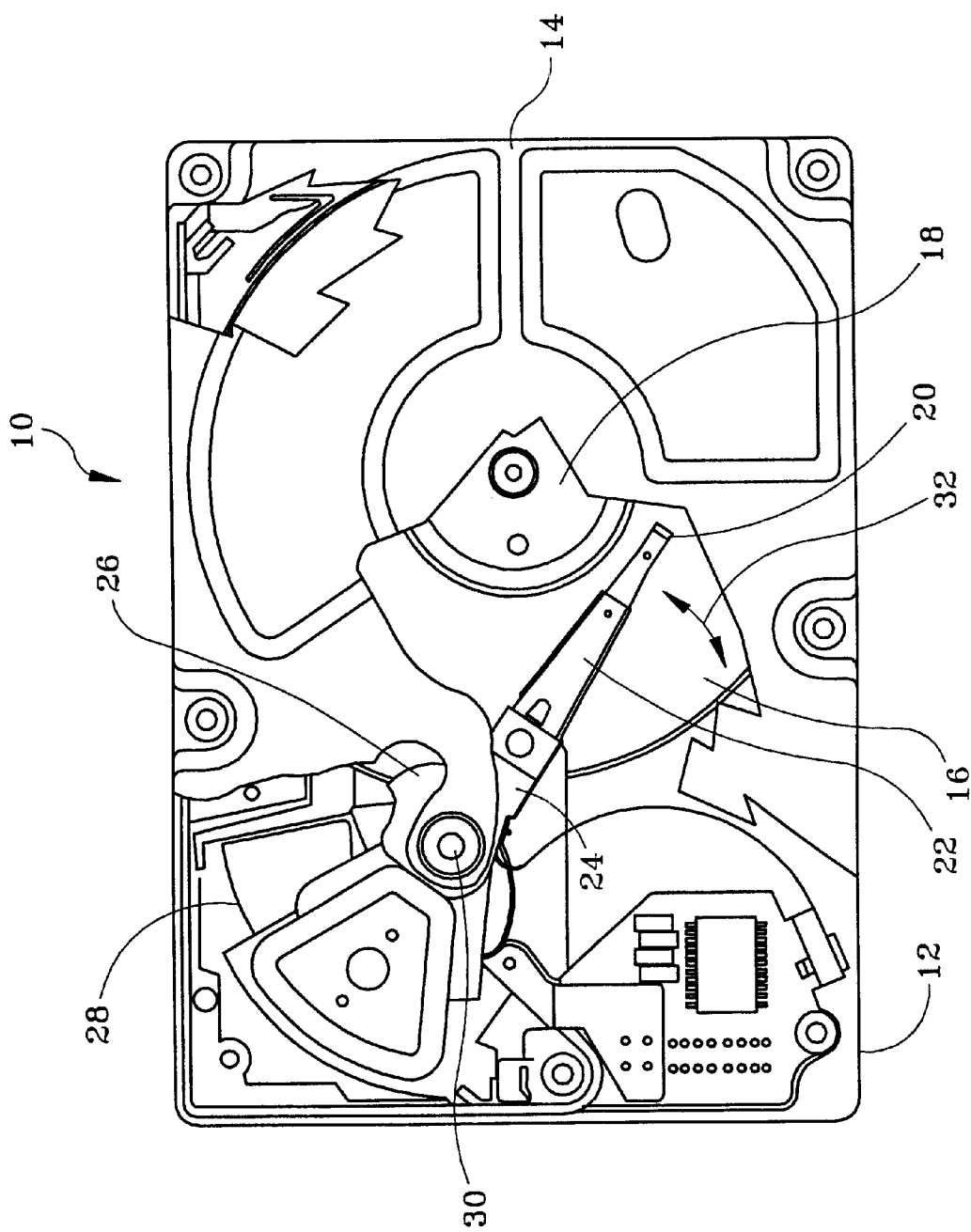
FIG. 1 is a top plan view of a disc drive data storage device in accordance with the present invention.

The present invention is a disc drive data storage device having a hydrodynamic bearing spindle motor in which one or more bearing surfaces have a wear resistant coating thereon. FIG. 1 is a top plan view of a disc drive 10 in which the present invention is useful. Disc drive 10 includes a housing base 12 that is combined with top cover 14 to form a sealed environment to protect the internal components from contamination by elements from outside the sealed environment.

Disc drive 10 further includes a disc pack 16, which is mounted for rotation on a spindle motor (not shown) by a disc clamp 18. Disc pack 16 includes a plurality of individual discs, which are mounted for co-rotation about a central axis. Each disc surface has an associated head 20, which is mounted to disc drive 10 for communicating with the disc surface. In the example shown in FIG. 1, heads 20 are supported by flexures 22, which are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path. While a rotary actuator is shown in FIG. 1, the present invention is also useful in disc drives having other types of actuators, such as linear actuators.

Figure 2:
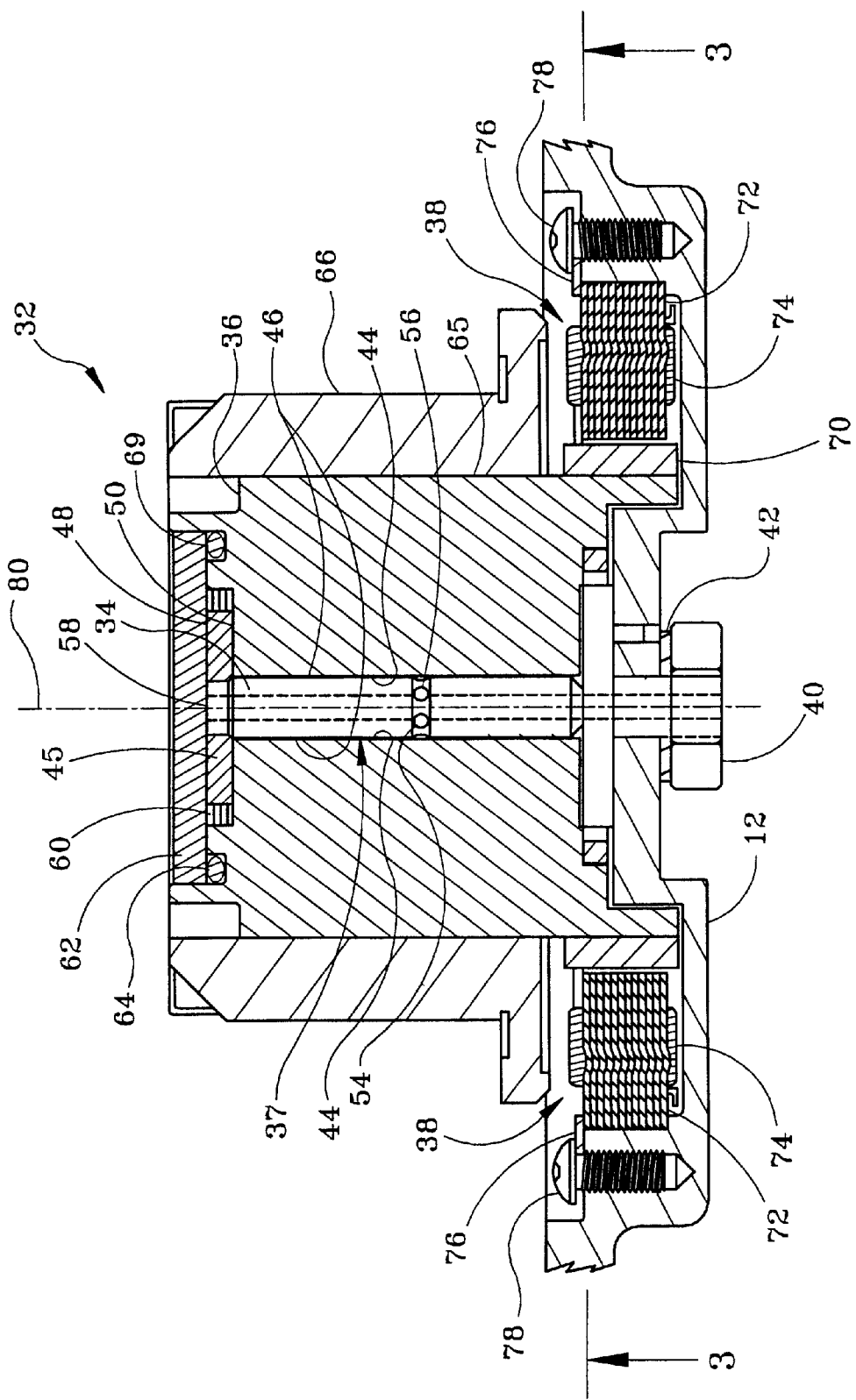
FIG. 2 is a sectional view of a hydrodynamic bearing spindle motor in accordance with the present invention.

FIG. 2 is a sectional view of a hydrodynamic bearing spindle motor 32 in accordance with the present invention. Spindle motor 32 includes a stationary member 34, a hub 36 and a stator 38. In the embodiment shown in FIG. 2, the stationary member is a shaft that is fixed and attached to base 12 through a nut 40 and a washer 42. Hub 36 is interconnected with shaft 34 through a hydrodynamic bearing 37 for rotation about shaft 34. Bearing 37 includes radial working surfaces 44 and 46 and axial working surfaces 48 and 50. Shaft 34 includes fluid ports 54, 56 and 58 that supply lubricating fluid 60 and assist in circulating the fluid along the working surfaces of the bearing. Lubricating fluid 60 is supplied to shaft 34 by a fluid source (not shown) that is coupled to the interior of shaft 34 in a known manner.

Spindle motor 32 further includes a thrust bearing 45, which forms the axial working surfaces 48 and 50 of hydrodynamic bearing 37. A counterplate 62 bears against working surface 48 to provide axial stability for the hydrodynamic bearing and to position hub 36 within spindle motor 32. An O-ring 64 is provided between counterplate 62 and hub 36 to seal the hydrodynamic bearing. The seal prevents hydrodynamic fluid 60 from escaping between counterplate 62 and hub 36.

Hub 36 includes a central core 65 and a disc carrier member 66, which supports disc pack 16 (shown in FIG. 1) for rotation about shaft 34. Disc pack 16 is held on disc carrier member 66 by disc clamp 18 (also shown in FIG. 1). A permanent magnet 70 is attached to the outer diameter of hub 36, which acts as a rotor for spindle motor 32. Core 65 is formed of a magnetic material and acts as a back-iron for magnet 70. Rotor magnet 70 can be formed as a unitary, annular ring or can be formed of a plurality of individual magnets that are spaced about the periphery of hub 36. Rotor magnet 70 is magnetized to form one or more magnetic poles.

Stator 38 is attached to base 12 and includes stator laminations 72 and stator windings 74. Stator windings 74 are attached to laminations 72. Stator windings 74 are spaced radially from rotor magnet 70 to allow rotor magnet 70 and hub 36 to rotate about a central axis 80. Stator 38 is attached to base 12 through a known method such as one or more C-clamps 76 which are secured to the base through bolts 78.

Commutation pulses applied to stator windings 74 generate a rotating magnetic field that communicates with rotor magnet 70 and causes hub 36 to rotate about central axis 80 on bearing 37. The commutation pulses are timed, polarization-selected DC current pulses that are directed to sequentially selected stator windings to drive the rotor magnet and control its speed.

In the embodiment shown in FIG. 2, spindle motor 32 is a "below-hub" type motor in which stator 38 has an axial position that is below hub 36. Stator 38 also has a radial position that is external to hub 36, such that stator windings 74 are secured to an inner diameter surface 82 (FIG. 3) of laminations 72. In an alternative embodiment, the stator is positioned within the hub, as opposed to below the hub. The stator can have a radial position that is either internal to the hub or external to the hub. In addition, while FIG. 2 depicts a spindle motor with a fixed shaft, the spindle motor may have a rotating shaft. In this case, the bearing is located between the rotating shaft and an outer stationary sleeve that is coaxial with the rotating shaft.

Figure 3:
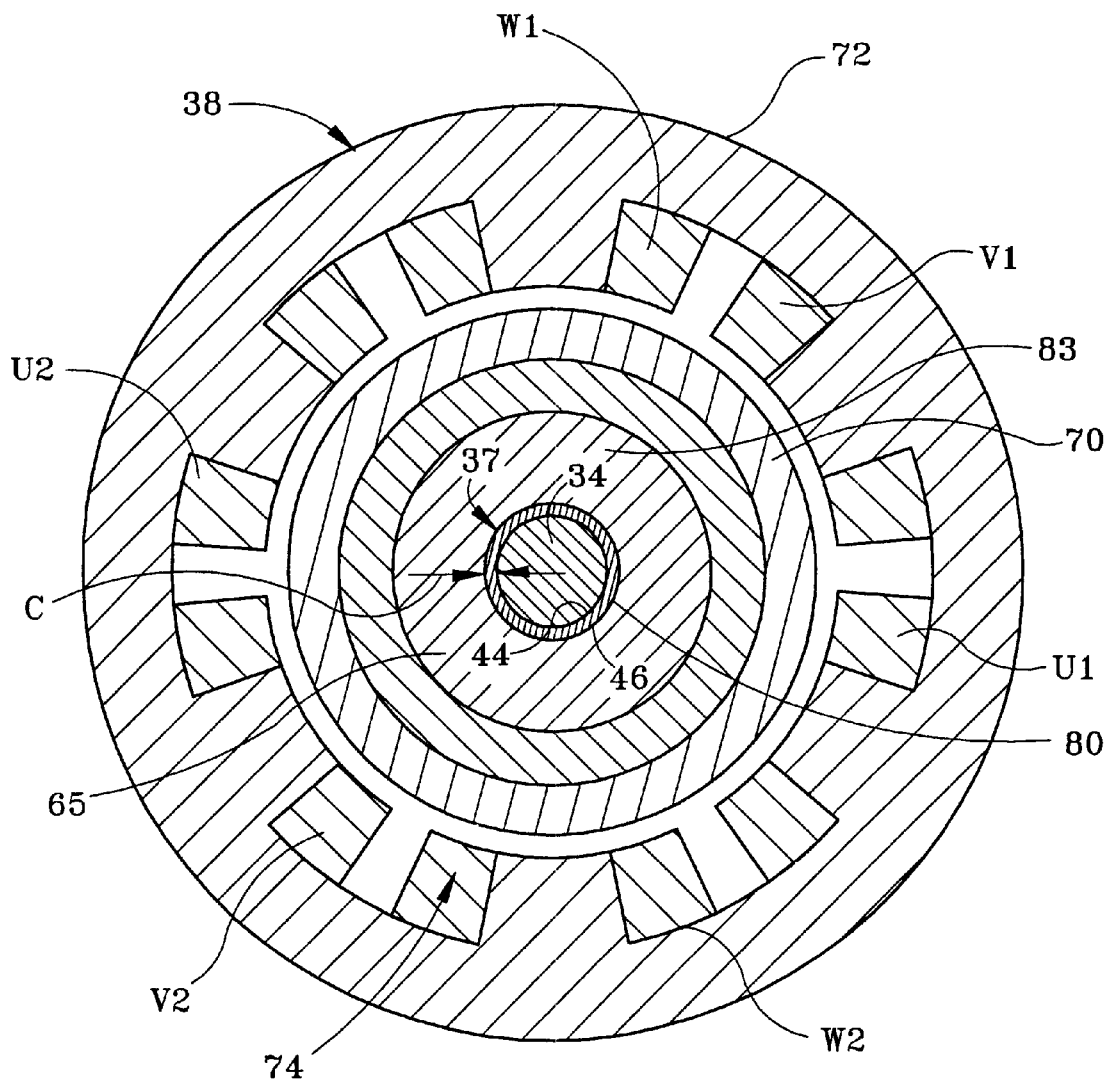
FIG. 3 is a diagrammatic sectional view of the hydrodynamic bearing spindle motor taken along the line 3—3 of FIG. 2, with portions removed for clarity.

FIG. 3 is a diagrammatic sectional view of hydrodynamic spindle motor 32 taken along line 3—3 of FIG. 2, with portions removed for clarity. Stator 38 includes laminations 72 and stator windings 74, which are coaxial with rotor magnet 70 and central core 65. Stator windings 74 include phase windings W1, V1, U1, W2, V2 and U2 that are wound around teeth in laminations 72. The phase windings are formed of coils that have a coil axis that is normal to and intersects central axis 80. For example, phase winding W1 has a coil axis 83 that is normal to central axis 80. Radial working surfaces 44 and 46 of hydrodynamic bearing 37 are formed by the outer diameter surface of shaft 34 and the inner diameter surface of central core 65. The shaft 34 and central core 65 may be constructed of a metal such as, for example, steel or aluminum. Radial working surfaces 44 and 46 are separated by a lubrication fluid, which maintains a clearance c during normal operation.

Figure 4:
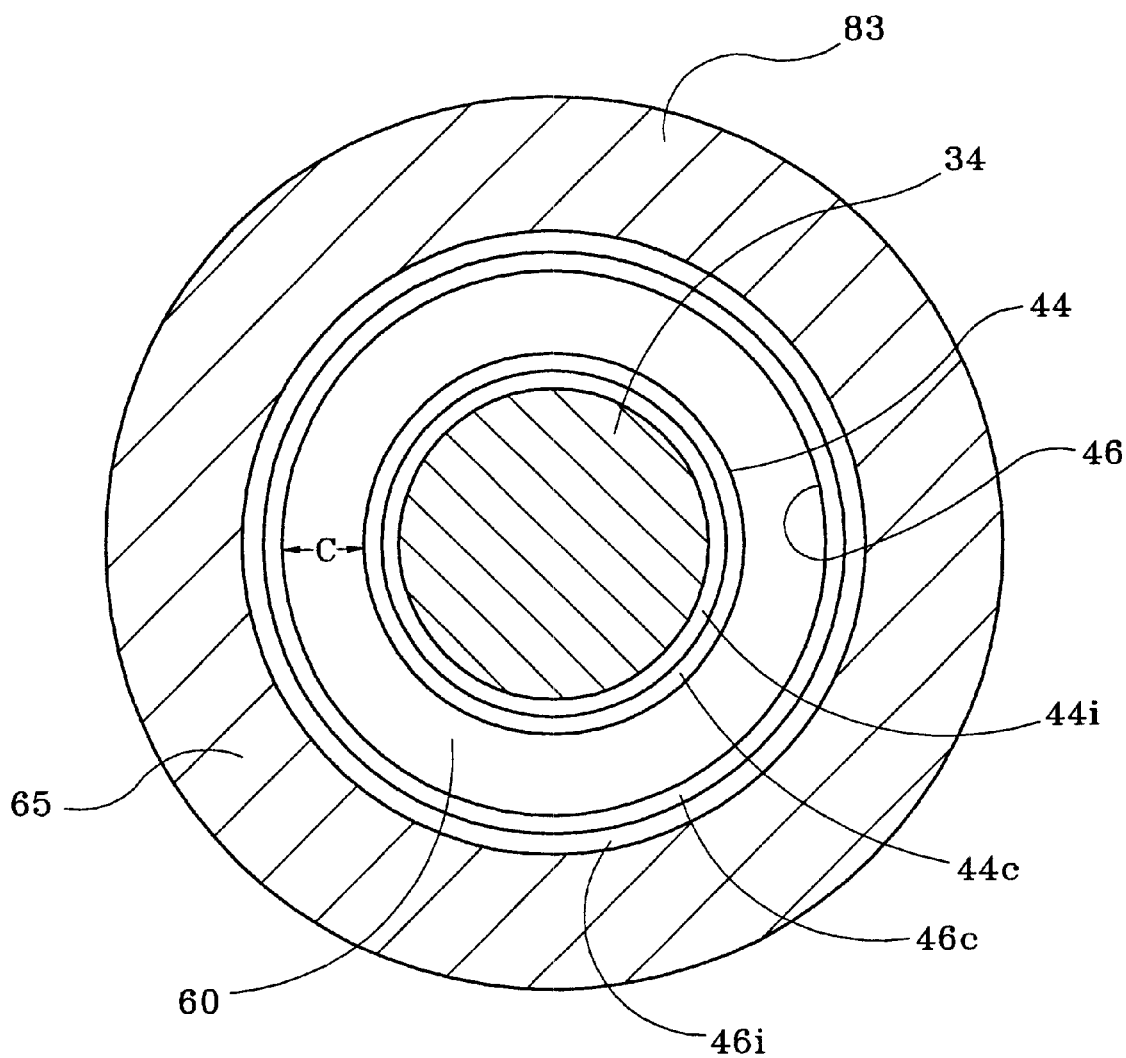
FIG. 4 is a close up view of FIG. 3, showing wear resistant coatings formed on one or more working surfaces of the hydrodynamic bearing.

FIG. 4 depicts a close-up sectional view of the hydrodynamic spindle motor 32 of FIG. 3. Either or both radial working surfaces 44 and 46 of hydrodynamic bearing 37 are treated with a wear resistant, low frictional coatings 44c and 46c. Wear resistant coatings 44c and 46c improve the wear resistance of radial working surfaces 44 and 46 by making working surfaces 44 and 46 more physically durable. Metal particle generation due to wear is reduced, resulting in much less mechanical failure of working surfaces 44 and 46. The wear resistant and low frictional coatings 44c and 46c provide improved wear resistance and generally provide for a clearance c that remains constant throughout the lifetime of the spindle motor.

The wear resistant coatings 44c and 46c may comprise, for example, amorphous carbon, diamond-like carbon, or combinations thereof. The wear resistant coating may have a thickness in the range of about 100 nanometers to about 5 microns. The preferred thicknesses of wear resistant coatings 44c and 46c are dependent upon factors such as the composition of the outer diameter of shaft 34 and inner diameter of central core 65, the magnitude of clearance c, surface roughness and loading, among others.

In one embodiment, wear resistant low frictional coatings 44c and 46c are deposited by physical vapor deposition (PVD), such as by a sputtering process. In another embodiment, wear resistant coatings 44c and 46c are deposited by chemical vapor deposition (CVD), such as plasma enhanced chemical vapor deposition (PECVD). In another embodiment, wear resistant coatings 44c and 46c are deposited by ion beam deposition. The wear resistant coating may also be sputtered in the presence of, for example, hydrogen ($H_2$) or nitrogen ($N_2$) to enhance the wear resistance and frictional properties thereof.

While FIG. 4 depicts wear resistant coatings 44c and 46c as consisting of only one layer, it is within the scope of the invention for wear resistant coatings 44c and 46c to consist of multiple coating layers. It is often desirable for wear resistant coatings 44c and 46c to consist of multiple layers in order to provide optimal adhesion, reduce crack propagation and to improve corrosion resistance of the shaft 34 and the central core 65. In one embodiment, wear resistant coatings 44c and 46c comprise two or more layers of carbon. In one embodiment, wear resistant coatings 44c and 46c comprise a layer of silicon carbide.

In one embodiment, one or more adhesive layers 44i and 46i are deposited on the outer diameter of shaft 34 and inner diameter of central core 65, respectively, prior to depositing wear resistant coatings 44c and 46c. Adhesive layers 44i and 46i provide improved adhesion and mechanical properties for the wear resistant coatings 44c and 46c to outer diameter of shaft 34 and inner diameter of central core 65. Adhesive layers may comprise, for example, chromium, silicon, titanium, zirconium, silicon carbide, and combinations thereof.

In another embodiment, one or more adhesion layers 44i and 46i may be used in combination with one or more wear resistant coatings 44c and 46c. For example, an adhesion layer may be used in combination with a wear resistant layer and a wear resistant, low frictional layer.

The thickness of adhesive layers 44i and 46i may be in the range of about 1 nanometer to about 1 micron. The preferred thickness of adhesive layers 44i and 46l is dependent upon factors similar to those enumerated above for the wear resistant coatings 34c and 36c. In one embodiment, either or both outer diameter surface of shaft 34 and the inner diameter surface of central core 65 are treated with a nickel or nickel phosphide plating solution prior to depositing adhesive layers 44i and 46i or wear resistant layers 44c and 46c. Electroless nickel plating solutions may also be used.

In one embodiment, adhesive layers 44i and 46i are deposited by physical vapor deposition (PVD), such as by a sputtering process. In another embodiment, adhesive layers 44i and 46i are deposited by chemical vapor deposition (CVD), such as plasma enhanced chemical vapor deposition (PECVD). In another embodiment, adhesive layers 44i and 46i are deposited by ion beam deposition.

In one embodiment, the substrate is etched prior to depositing the adhesive layer and the wear resistant coating. In the case where no adhesive layer is deposited, the substrate may be etched prior to depositing the wear resistant coating. The substrate may be etched, for example, by a plasma etching process. The plasma etching process may comprise bombarding the substrate with ions of an inert gas such as, for example, argon.

Alternatively or in addition to wear resistant coatings 44c and 46c deposited on the outer diameter of shaft 34 and inner diameter of central core 65, wear resistant coatings may be deposited upon other working surfaces of the spindle motor, such as, for example, axial working surface 48 on thrust bearing 45 or on lower surface 69 of counterplate 62, shown in FIG. 2. Optionally, adhesive layers, such as those discussed above, may be deposited prior to the deposition of the wear resistant low frictional coatings.

EXAMPLE 1

An adhesive layer was deposited on a steel substrate. The adhesive layer comprised chromium. The adhesive layer was deposited by a sputtering process, in which an inert gas sputtered material from a chromium target. An adhesive layer having a thickness of about 0.3 microns to about 0.5 microns was deposited.

A wear resistant low frictional coating was deposited on the chromium adhesive layer. The wear resistant coating comprised carbon. The wear resistant coating was deposited by a sputtering process, in which an inert gas sputtered material from a carbon target. A wear resistant coating having a thickness of about 1.5 microns to about 2 microns was deposited. The wear resistant coating exhibited excellent adhesion to the substrate.

EXAMPLE 2

An adhesive layer was deposited on a steel substrate. The adhesive layer comprised silicon. The adhesive layer was deposited by a sputtering process in which an inert gas sputtered material from a silicon substrate. An adhesive layer having a thickness of about 0.3 microns to about 0.5 microns was deposited.

A wear resistant low friction coating was deposited on the silicon adhesive layer. The wear resistant coating comprised carbon. The wear resistant coating was deposited by a sputtering process in which an inert gas sputtered material from a carbon target. A wear resistant coating having a thickness of about 1.5 microns to about 2 microns was deposited. The wear resistant coating exhibited excellent adhesion to the substrate.

The use of wear resistant and adhesive layers for improved wear performance is not limited to thrust bearing designs described above. Wear resistant and adhesive coatings may be used, for example, with spindle motors having bearing surfaces of other geometries known to the art. Conical and spherical bearing surfaces may be coated with the wear resistant coating of the present invention to reduce wear on the bearing surfaces.

Referring to FIG. 5, a hydrodynamic bearing is shown with conical bearing surfaces, which is usable to drive the discs in the disc drive 10 of FIG. 1. The hydrodynamic bearing is shown incorporated in a spindle motor 150. The design includes a drive rotor or hub 114 rotatably coupled to a shaft 152. The shaft 152 includes an upper hemisphere or convex portion 154 and a lower hemisphere or convex portion 156 received in a sleeve 158 which rotates relative to the shaft. The shaft is fixedly attached to a base 160, which may be incorporated in or supported from the housing base 12 described with respect to FIG. 1. The sleeve 158 receives the journal 162 of shaft 152 and has upper hemisphere shaped, concave receptacle 164 and lower hemisphere shaped concave receptacle 166. A fill hole 168 is also provided to a reservoir 159 in (as drawn, the upper end) fixed member 152, to provide bearing fluid to the hydrodynamic bearing. The rotor 114 includes a counterplate 170, which is used to close off one end of the hydrodynamic bearing to the atmosphere. In operation, the bearings shown in this figure comprise hydrodynamic bearings in which fluid such as oil circulates through gaps between the fixed member, which is the shaft and the rotating member, which in this case is the sleeve. One or more of these bearing surfaces may also be coated with the wear resistant layers of the present invention.

While foregoing is directed to the preferred embodiment of the present invention, other and further embodiments of the invention may be devised without departing from the basic scope thereof, and the scope thereof is determined by the claims that follow.

What is claimed is:

1. A disc drive storage system comprising:
   a housing having a central axis;
   a stationary member that is fixed with respect to the housing and coaxial with the central axis;
   a stator fixed with respect to the housing;
   a rotatable member that is rotatable about the central axis with respect to the stationary member;
   a rotor supported by the rotatable member and magnetically coupled to the stator;
   at least one data storage disc attached to and coaxial with the rotatable member;
   an actuator supporting a head proximate to the data storage disc for communicating with the disc; and
   a hydrodynamic bearing interconnecting the stationary member and the rotatable member, the bearing having at least one working surface including a wear resistant, low frictional coating having a thickness within a range of about 3000 nanometers to about 5 microns.

2. The disc drive storage system of claim 1 wherein the wear resistant low frictional coating comprises amorphous carbon, diamond-like carbon, hydrogenated amorphous carbon, nitrogenated amorphous carbon, hydrogenated diamond-like carbon, nitrogenated diamond-like carbon and combinations thereof.

3. The disc drive storage system of claim 1 wherein the wear resistant low frictional coating comprises two or more layers.

4. The disc drive storage system of claim 1 wherein the wear wear resistant low frictional coating is deposited by at least one of the physical vapor deposition (PVD), chemical vapor deposition (CVD) and plasma enhanced chemical vapor deposition (PECVD).

5. The disc drive storage system of claim 1 wherein the wear resistant coating is formed on an adhesive layer.

6. The disc drive storage system of claim 5 wherein the adhesive layer comprises chromium, silicon, titanium, zirconium, silicon carbide and combinations thereof.

7. The disc drive storage system of claim 5 wherein the adhesive layer has a thickness in the range of about 1 nanometer to about 1 micron.

8. The disc drive storage system of claim 5 wherein the adhesive layer is deposited by at least one of physical vapor deposition (PVD), chemical vapor deposition (CVD) and plasma enhanced chemical vapor deposition (PECVD).

9. A motor comprising:
   a housing having a central axis;
   a stationary member that is fixed with respect to the housing and coaxial with the central axis;
   a stator fixed with respect to the housing;
   a rotatable member that is rotatable about the central axis with respect to the stationary member;
   a rotor supported by the rotatable member and magnetically coupled to the stator; and
   a hydrodynamic bearing interconnecting the stationary member and the rotatable member, the bearing having at least one working surface including a wear resistant, low frictional coating having a thickness within a range of about 3000 nanometers to about 5 microns.

10. The motor of claim 9 wherein the wear resistant, low frictional coating comprises amorphous carbon, diamond-like carbon, hydrogenated amorphous carbon, nitrogenated amorphous carbon, hydrogenated diamond-like carbon, nitrogenated diamond-like carbon and combinations thereof.

11. The motor of claim 9 wherein the wear resistant low frictional coating comprises two or more layers.

12. The motor of claim 9 wherein the wear resistant low frictional coating is deposited by at least one of physical vapor deposition (PVD), chemical vapor deposition (CVD) and plasma enhanced chemical vapor deposition (PECVD).

13. The motor of claim 9 wherein the wear resistant, low frictional coating is formed on an adhesion layer.

14. The motor of claim 13 wherein the adhesion layer comprises chromium, silicon, titanium, zirconium, silicon carbide and combinations thereof.

15. The motor of claim 13 wherein the adhesion layer has a thickness in the range of about 1 nanometer to about 1 micron.

16. The motor of claim 13 wherein the adhesion layer is deposited by at least one of physical vapor deposition (PVD), chemical vapor deposition (CVD) and plasma enhanced chemical vapor deposition (PECVD).

17. A motor, comprising:
   a hydrodynamic bearing interconnecting a stationary member and a rotatable member, wherein the hydrodynamic bearing has at least one working surface; and
   the at least one working surface includes a wear reducing means thereon having a thickness within a range of about 3000 nanometers to about 5 microns.

18. The motor of claim 17 wherein the wear reducing means is formed on an adhesion means.

* * * * *